UNITED STATES PATENT OFFICE.

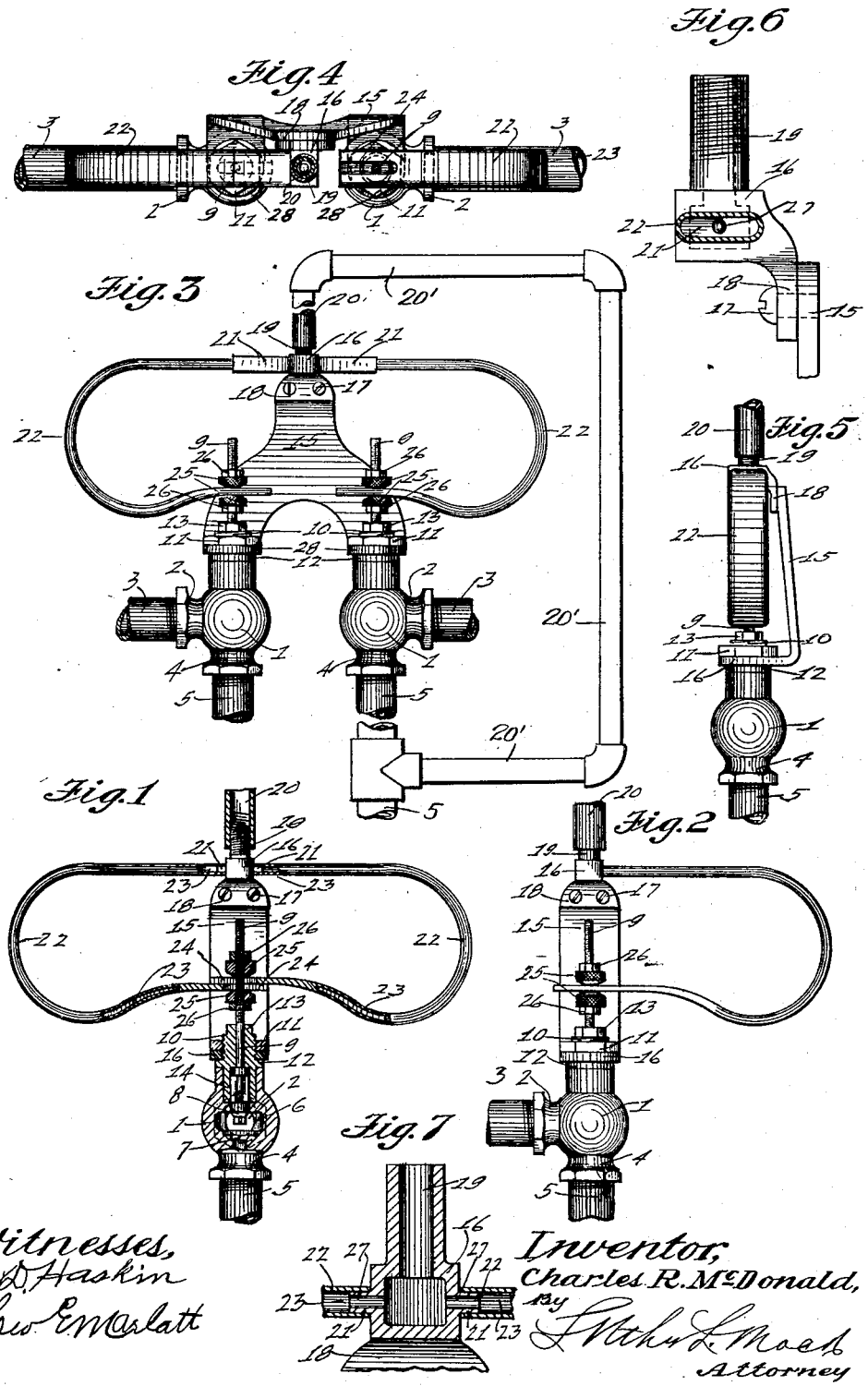

CHARLES R. McDONALD, OF LONG BEACH, CALIFORNIA.

PRESSURE-REGULATOR.

1,219,974.   Specification of Letters Patent.   Patented Mar. 20, 1917.

Application filed November 27, 1915. Serial No. 64,787.

*To all whom it may concern:*

Be it known that I, CHARLES R. McDONALD, a citizen of the United States, residing at Long Beach, in the county of Los Angeles and State of California, have invented a new and useful Improvement in Pressure-Regulators, of which the following is a specification.

My invention relates to pressure regulators for application to steam, water, gas, compressed air and vacuum service systems, as well as for other purposes where it is necessary to control the pressure, and my improved device is also adapted to be used as a reducing pressure means.

I am aware that certain other types of pressure regulators have been used and patented heretofore, but I am not aware that anyone has even conceived the improvements herein set forth, the primary object of my improvements being to provide a regulator for general engineering purposes which may be readily attached to the service system of a building or plant and the structure of which is of such a simple character as to render the device extremely economical, but withal substantial and capable of extended use.

In the several applications of my device it is possible to alter the form of the structure to meet the varying conditions but the underlying principle for regulating the pressure by automatic means is identical in all of the variations. A further object of this invention is the provision of means for adjusting the regulating mechanism to a desired degree and for locking such means when so adjusted so that the device may be set for a given pressure and the adjustment maintained until further adjustment is desired or necessary. Other objects may appear in the subjoined detailed description.

Referring to the drawings, which accompany and form a part of this specification and in which similar characters of reference indicate the same parts throughout the several views, Figure 1 is an elevation, partly in section, of one form of my device; Fig. 2 is an elevation of another form of device; Fig. 3 is a similar view of the device in the form of a twin regulator; Fig. 4 is a plan, partly broken away, of Fig. 3; Fig. 5 is a side elevation of Fig. 2; and Fig. 6 is an enlarged view of the regulator support; Fig. 7 is a transverse section of the pressure head.

I will now give a detailed description of the structure, operation and use of my invention, the several views hereinbefore described, showing the application of my improved device to an ordinary type of valve 1 such as is generally used in the steam supply line to a water pressure pump, but it will become obvious as the description progresses that any type of valve may be used in connection with the improved regulating means, depending upon the particular use to which the device is put.

In all of the several views the same type of valve 1 is represented, the valve being shown in section in Fig. 1. The valve inlet 2 is connected with the pipe 3 for steam, gas, air, water or vacuum service and the valve outlet 4 is connected with a pipe 5 on the pressure or service side of the valve. The valve recess 6 has a seat 7 to receive the valve 8 which has the upwardly extending stem 9 and the valve and stem are slidably held in the valve head 10 which is threaded beyond the valve body 1 to receive a nut 11, has a flange 12 adjacent to the body 1 and a hexagon end 13 is provided on the head by means of which the lower end 14 may be screwed into the body 1 against the flange 12.

A bracket 15, having a forwardly extending foot 16 is bored to fit on the upper end of the head 10 and is adapted to be securely attached to the head by tightening the nut 11. The upper end of the bracket 15 serves as a support for the pressure inlet head or bracket 16 which is secured to the bracket 15 by means of screws 17 extending through a depending lug 18. The body of the pressure head 16 is cored out and is provided at the top with the inlet extension 19 which is adapted to be secured to a pipe 20 leading from the pressure side of the valve 1, and connected by means of a pipe 20' to the service pipe 5, as shown in Fig. 3.

Lugs 21 having an oblong shape, are formed on and extend outwardly from the pressure head 16 and are adapted to receive and be fitted and secured to and project slightly into the ends of the curved tubes 22, one of these lugs being provided on each side of the head for the form of device represented in Figs. 1 and 3 and only a single lug being provided in the form of device shown in Fig. 2. The tubes 22 have elongated pressure chambers 23 of flattened or oblong cross section and the walls of the tube are comparatively thin. The lower ends of the tubes are solid, as shown in Fig. 1, and are provided with a forked end with a slot 24 between the forks, as shown in Figs. 1 and 4, and the stem 9 extends upwardly through and substantially beyond the slots and is provided with a pair of knurled thumb nuts 25 and lock nuts 26, one of each being placed above and below the end of the tube and threaded on the stem for adjusting the position of the tube ends on the valve stems, and, as the tubes are expansible and contractible, as hereinafter described, the movement of the tubes at their lower ends will effect the movement of the valve stems and valves for regulating the pressure in the service pipes.

The tubes 22 should be soldered or otherwise secured to the lugs 21 on the heads 16 so that a water and steam tight joint may be provided for each of the tubes and the tubes are curved outwardly from the valve 1 and the head 16 for a convenient distance for slightly more than the diameter of a circle which would be formed on the radius of the outer curve of the tubes which is slightly in excess of 180 degrees, as shown, for the best results.

One or more of the tubes may be used as a regulator for one or more of the valves 1 and the size of the tubes may vary substantially for providing more or less tension for greater or less pressure to be exerted on and applied to the valve stems 9. A single tube is shown in Fig. 2 with a single valve. A single valve is shown in Fig. 1 with two similar tubes, and a pair of tubes and valves is shown in Fig. 3, thus illustrating some of the modifications of my device to suit different conditions. In the form of device shown in Fig. 1, the two tube ends are in engagement with the single valve stem, one of the tube ends being above the other, and in all cases the adjusting nuts on the valve stems are so placed and locked that a free movement of the tube ends may be had at all times to accommodate any change of the pressure and for regulating the valve to correspond with the pressure on the service line. When two valves are used with a single regulator, as shown in Fig. 3, the lugs 21 on the pressure head 16 should be elongated substantially as shown so that the maximum expansion and contraction of the tubes may result from the change of pressure. The heads 16 have ports 27 in the lugs 21 for admitting the water, gas, steam or air into the tubes 22, and these ports are substantially smaller than the area of the tubes 22 for the purpose of maintaining a maximum pressure in the tubes. The form of bracket 15 is changed substantially for the twin device shown in Fig. 3, separate legs 28 being provided for each of the valves 1 shown.

When used as a regulator for a steam pump, for instance, the pressure head inlet 19 is connected with the pipe 20 leading to the water pipe from the pump and the valve 1 is connected by means of the inlet 2 and the pipe 3 with the steam supply for the pump. The desired pressure in the water service pipes having been determined, the tension of the resilient tubes 22 is adjusted by moving the knurled nuts 25 and the lock nuts 26 on the stem with the tube ends held therebetween, when the nuts may be set and locked together on the stem, thus fixing the position of the tube ends and fixing the degree of tension of the tubes to correspond with the pressure in the service pipes. The water from the service lead is forced into the tubes 22 through the ports 27 in the head 16 and the pressure in the tubes 22 will always be the same as that in the service lead. If the steam pressure in the supply pipe is in excess of or below the normal pressure, the action of the pump will affect the water pressure in the service lead correspondingly and the tubes 22 will be caused to expand or contract, as the case may be, the lower ends of the tubes in such case moving upwardly or downwardly and thus opening or closing the valve 8 in the valve body 1 to correspond to the change in pressure. This action of the tubes and valve is constant and automatic for every fluctuation of the pressure in the steam or water pipes and insures a positive means for regulating the pressure and maintaining a normal efficiency of the pump at all times without manual attention.

My improved mechanism may be used as a pressure reducing means for any kind of service by interposing the valve 1 in and connecting it with the service lead at the inlet 2 and the outlet 4 and connecting the pipe 20 from the head 16 with the pipe 5 from the outlet 4. In such case the tubes 22 are adjusted to the pressure desired, which will be less than that in the valve 1 and the pipe 3, and the pressure in the pipe 5 will be maintained at the desired degree in the same manner as hereinbefore described in connection with the pump.

When my device is used for regulating the vacuum system, it is necessary that the form of valve should be changed and the valve inverted, as compared with the form shown in Fig. 1, but the action of the regulator is the same as in the cases just described, except that the vacuum will contract instead of expand the tubes.

The form of regulator shown in Fig. 3 may be used for regulating an oil burning furnace by connecting one of the valves 1 with the steam supply from the boiler and the other with the oil supply, the tubes 22 being in such case separately adjusted for the difference in the oil and steam pressures, thus serving effectively for the purpose of regulating the action of the burner by controlling both the steam and oil supply simultaneously. The pipe 20' shown in Fig. 3 connects the oil service pipe 5 with the pipe 20 for directing the pressure from the pipe 5 to the tubes 22, in such case, which pressure serves to control the steam and oil supply in the pipes 3 simultaneously.

The diversified and numerous purposes for which my regulating means may be used, its simplicity of structure and automatic operation commend it for all general purposes where it is necessary to maintain a given pressure without manual attention.

Having thus described my invention, what I claim as new and desire Letters Patent for, is:—

1. In a device of the character described, the combination of a pressure supply valve connected with the supply and service lines and having an extended valve stem, supporting means carried by said valve having an expansible and contractible pressure regulating tube held thereon, said tube being open and rigidly connected with the service line at one end, closed at the other end and adjustably and loosely connected with said valve stem, for permitting the movement of the tube relative to the valve stem when the tube is expanded and contracted.

2. In a device of the character described, the combination of a supply valve having an extended valve stem, a bracket supported thereon and rigidly attached thereto, an expansion tube connected with the service line from said valve and rigidly held on said bracket at one end, and means for loosely connecting the other end of said tube with said valve stem so as to render the lower end of the tube movable on the stem, for regulating the pressure in the service line.

3. In a device of the character described, the combination of a supply and a service pipe having a valve interposed therebetween, an extended valve stem in said valve, a bracket attached to the valve body, a pressure tube adjustably held on said valve stem at one end and capable of movement on said stem during the expansion and contraction of the tube, said tube being open at one end and connected with the service pipe and closed at the other end and supported at the open end on said bracket, and means on said valve stem for adjusting the position of the movable end of the tube, for regulating the pressure in the service pipe.

4. In a device of the character described, the combination with the valve body and the supply and discharge pipes connected therewith, of a removable valve head insertible in said body and substantially extended therebeyond, a bracket rigidly carried on said extension and removable therefrom, a valve stem movable in said body and said head and extended substantially above said head, there being a chamber formed on the upper portion of said bracket in communication with said discharge pipe, expansion tubes connected with said chamber at their upper ends and movably held on said valve stem at their lower ends, and means on said valve stem for adjusting the position of said tubes relative to and on said stem, for regulating the operation of said valve, as described.

Signed at Los Angeles, in the county of Los Angeles and State of California, this 8th day of November, 1915.

CHARLES R. McDONALD.

Witnesses:
  J. D. HASKIN,
  GEO. E. MARLATT.

Copies of this patent may be obtained for five cents each, by addressing the "Commissioner of Patents, Washington, D. C."